United States Patent [19]

Aucouturier

[11] 4,299,445
[45] Nov. 10, 1981

[54] ADJUSTABLE FOCUSING MIRROR

[75] Inventor: Lucien Aucouturier, Le Vesinet, France

[73] Assignee: SEMED, Nanterre, France

[21] Appl. No.: 74,797

[22] Filed: Sep. 12, 1979

[30] Foreign Application Priority Data

Sep. 20, 1978 [FR] France .................................. 78 26965
Jan. 2, 1979 [FR] France .................................. 79 00036

[51] Int. Cl.³ ............................................. G02B 5/10
[52] U.S. Cl. .................................. 350/295; 350/292; 350/310; 350/320
[58] Field of Search ............... 350/292, 293, 295, 296, 350/310, 320; 126/438

[56] References Cited

U.S. PATENT DOCUMENTS

| | | | |
|---|---|---|---|
| 1,946,184 | 2/1934 | Abbott | |
| 2,760,920 | 8/1956 | Olsen | 126/451 X |
| 2,976,533 | 3/1961 | Salisbury | 350/296 |
| 3,049,055 | 8/1962 | Tubbs | 350/296 |
| 3,108,279 | 10/1963 | Eisentraut | 350/292 |
| 3,620,606 | 11/1971 | Tschunko | 350/310 |
| 3,906,927 | 9/1975 | Coplan | 126/438 |
| 3,988,166 | 10/1976 | Beam | 138/89 |
| 3,993,528 | 11/1976 | Pauly | 126/438 |
| 4,131,336 | 12/1978 | Miller et al. | 350/292 |
| 4,141,626 | 2/1979 | Treytl et al. | 350/295 |

Primary Examiner—F. L. Evans
Attorney, Agent, or Firm—James E. Nilles

[57] ABSTRACT

An adjustable focusing mirror, comprising a support on which is mounted a plurality of small plane mirror elements, wherein the support of the focusing mirror comprises a molded concrete structure with a reference face on which the small plane mirror elements are adhesively fixed, at a small distance from one another, but without any contact between them, and wherein the molded concrete structure is fitted with pre-stressing elements for adjusting the concavity of the said reference face carrying the mirror elements.

27 Claims, 9 Drawing Figures

ADJUSTABLE FOCUSING MIRROR

The present invention relates to an adjustable focusing mirror, comprising a support on which are mounted a plurality of small plane mirror elements.

It is often advantageous to have large mirror areas capable of concentrating the light on a very small if not a pinpoint area. Such mirrors are especially necessary in fitting out heliostats intended to reflect the sun light in order to focus it on a spot where a boiler is installed, which boiler is capable of collecting the energy of the focused sun light.

Generally, an installation aiming at collecting the solar energy comprises a very large number of solar reflectors or heliostats spread over a large ground surface and intended to focus the solar energy on a generator which is often raised from the ground and installed at the top of a small tower. Each heliostat is like a large mirror of substantially parabolic shape. Each mirror needs to be made with the greatest accuracy so that the incident rays of the sun which are substantially parallel can be accurately focused on the boiler. Considering the distances involved, the supports of the mirrors should be very stable. Moreover, said supports should be able to move slowly in order to allow the mirrors to follow the movements of the sun.

Heliostats have already been produced which comprise a movable mirror mounted on a metal frame. Each mirror is composed of a plurality of small plane mirror elements, individually adjustable, to ensure an accurate focusing of the light. Mechanical systems with bearings and pinions also permit to change the position of the small mirror elements of an heliostat as a function of the course of the sun. Such a system shows its limitations in the production of rather large heliostats and it remains relatively complex of construction and in the control of the small mirror elements. The metallic frame, for example, has to be made very rigid to withstand the effect of winds, and moreover it needs to be very carefully produced in order to prevent any irregular heat expansions which would interfere with the accuracy of the system. All this contributes to increasing the production costs. The different systems of mechanical control are also quite complex and need regular maintenance. Finally, the use of metallic frames is ill-suited to mass production.

It is precisely the aim of the present invention to overcome the aforesaid drawbacks and to allow the production of focusing mirrors which are stable, capable of being easily adjusted and swivelled, and have a very good reflecting power whilst requiring only a minimum of maintenance and being suitable, without difficulty, to be mass-produced.

These objects are attained with an adjustable focusing mirror, comprising a support on which is mounted a plurality of small plane mirror elements, wherein the support of the focusing mirror comprises a molded concrete structure with a reference face on which the small plane mirror elements are adhesively fixed, at a small distance from one another, but without any contact between them, and wherein the molded concrete structure is fitted with pre-stressing elements for adjusting the concavity of the said reference face carrying the mirror elements.

The molded concrete structure thus forms a highly rigid and stable support for the different mirror elements, the fitting of which is easier since they are stuck directly on to a reference surface of the concrete structure. The pre-stressing elements are themselves an easy and accurate means of controlling the different mirror elements, thereby permitting to produce focusing mirrors of predetermined characteristics. The concrete structure, which is not restricted in size, is very suitable for mass-production and requires no special maintenance.

The molded concrete structure is advantageously constituted by a honeycombed structure comprising an outer shell in reinforced concrete braced by concrete ribs separating the different cells.

These cells may be filled with a light padding material such as paper, cardboard, expanded polystyrene.

According to one particular embodiment, the pre-stressing elements are constituted by threaded elements such as rods or wires distributed over a surface which is offset with respect to the average median surface of the molded concrete structure.

The threaded rods are preferably arranged so as to give an isotropic pre-stressing and can be adjusted individually or in a group.

To absorb any differential deformations between the plane mirror elements in glass and the reference surface of the concrete, the small mirror elements are fixed on the said reference surface by means of a layer of adhesive of the thermoplastic synthetic rubber type, the joining spaces between the mirror elements being filled with a plastic material. In this way, the mirror elements suffer no stresses and can be constituted by very thin plates of glass.

The molded concrete structure on which are fixed the mirror elements can easily be mounted to pivot with respect to two perpendicular axes.

According to a special embodiment, the support comprises at least one concrete element shaped as a disc portion, integral with the structure on which are fixed the mirror elements, on the side opposite the reference face carrying the mirror elements, and the said disc shaped element is covered on its edge with a metal strip capable of sliding on Teflon bearings fitted on a concrete post. The concrete post(s) supporting the concrete disc(s) are mounted on a plate having a lower contact surface in polished metal which rests on Teflon bearings and can slide with respect to said bearings.

In the case of an heliostat, it is most important to have a structure capable of offering a good stability, even in hard climate conditions such as strong wind conditions, whilst permitting slight movements of the mirror to allow the latter to follow the movements of the sun.

In order to increase the stability of the focusing mirror whilst making it easy for said mirror to move, the support integral with the molded concrete structure comprises a concrete cylinder covered with a metal strip capable of sliding on first bearings placed on a concrete plate, which concrete plate is provided with a lower contact surface in polished metal capable of sliding on second bearings placed on a fixed concrete post.

The cylinder is mounted on the first bearings so that, by sliding on said bearings, it can pivot about a horizontal axis, and the plate is mounted on the second bearings so that, by sliding on said bearings, it can rotate about a vertical axis.

The axis of the cylinder is situated in the median plane of the molded structure which is parallel to the longitudinal upper and lower edges of said structure, and is preferably found to be adjacent the horizontal median axis of said molded structure.

The second bearings supporting the plate are arranged in a plane situated, when the molded concrete structure is in the vertical position, at a distance from the lower end of the cast structure which may vary between about a quarter, or preferably a third, and half the height of the molded structure.

The support integral with the molded structure advantageously comprises two arms perpendicular to the said structure, between which is suspended the concrete cylinder covered with its metal strip.

The two arms of the support integral with the molded structure form a pendulum and are widened at their free end to counter-balance the cast structure.

According to one characteristic feature of the present invention, the plate comprises a cradle-shaped top portion which carries the second bearings and receives the cylinder.

In such a case, the top portion of the plate comprises pairs of wedges defining inclined surfaces that are convergent and parallel to the axis of the cylinder.

The invention further relates to a process for manufacturing a focusing mirror, consisting in pouring concrete into a mold of which at least one form face has a predetermined aspect, with a view to making a concrete structure having at least one reference face, in fitting the said concrete structure with elements capable of pre-stressing the said structure, in sticking on the reference surface of the said structure a plurality of small and thin plane mirror elements at a small distance from one another and with no contact between them, and in adjusting the concavity of the structure by exerting on the pre-stressing elements a tension or a compression.

The pre-stressing elements may be positioned in the mold before all the concrete is poured in, in an offset manner with respect to the average median surface of the structure to be molded.

Other characteristics and advantages of the invention will be more readily understood from the following description of several different embodiments given by way of example and non-restrictively, reference being made to the accompanying drawings in which.

Figure 1:
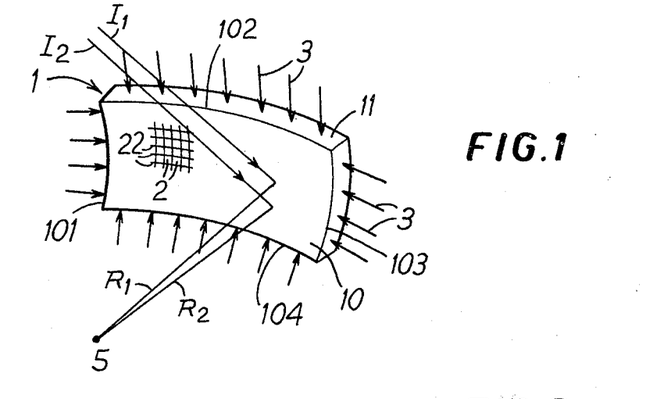
FIG. 1 is a diagrammatical perspective of a mirror according to the invention.

FIG. 1 diagrammatically shows a concave mirror 1 comprising a support structure 11 in concrete, provided with a reference face 10 on which are adhesively fixed small plane mirror elements 2 arranged at a small distance from one another, although not placed edge to edge, and separated from one another by joints 22. The plane mirror elements 2 can for example be constituted by very thin plates of silver-plated glass, and square or oblong in shape.

Pre-stressing elements 3, symbolized by arrows in FIG. 1, exert a permanent and controllable action on the concrete structure 11 to confer to the latter, and in particular to the reference face 10 carrying the mirror elements 2, the desired concavity. In the example of FIG. 1, the concavity is such that parallel incident rays $I_1$, $I_2$ are reflected in the form of rays $R_1$, $R_2$ converging into a single focus point 5. In the example illustrated in FIG. 5 by way of a variant, incident parallel rays $I_3$, $I_4$ are reflected in the form of rays $R_3$, $R_4$ cutting through a single line 51. Depending on the concavity given to the face 10, it is thus possible to concentrate the light in one or more focus points, or in a specific area, according to the laws of the geometrical optics. The pre-stressing elements 3, spread out into a sheet or a network, act directly on the structure 11 itself, thereby avoiding an individual adjustment of each plane mirror element.

Figure 2:
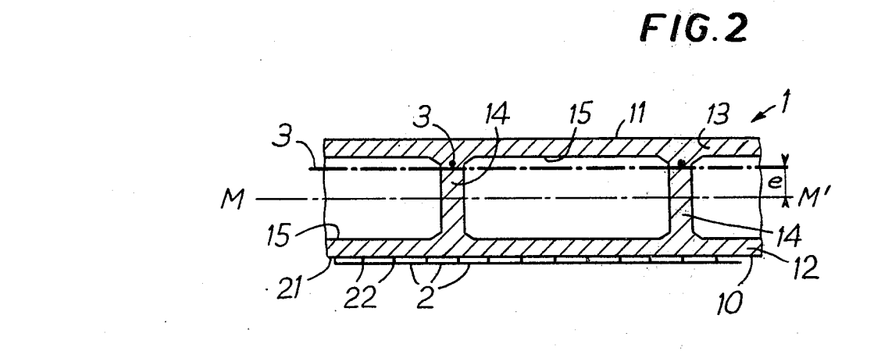
FIG. 2 is a cross-sectional view of a cast concrete structure supporting the reflecting face of a mirror according to the invention.

FIG. 2 illustrates in more detail the structure of the mirror 1 according to the invention. A structure 11 comprises a double shell 12, 13 in reinforced concrete, braced with ribs 14 also in concrete. Cells 15 are provided between the faces of the two opposite shell portions 12, 13 and the ribs 14. Said cells 15 can be filled with any conventional type of padding material such as cardboard, paper, expanded polystyrene. A honeycomb concrete structure has the advantage of keeping relatively light whilst remaining nevertheless extremely stable.

A structure 11 is built as follows. A first concrete form of great precision is made to produce the reference surface 10 by pouring a first layer of concrete with a view to forming the shell 12. Light packing materials are then deposited in localized areas 16 above the shell 12 to form the cells 15. More concrete is then poured to form the shell 13 and the ribs joining the two shells 12 and 13 between the cells 15. The concrete may of course be re-inforced by any of the conventional means, using for example welded wire nettings. The concrete forms can be made for example from laminated polyester resin or from similar material, permitting, at least as far as the form for producing the reference surface 10 as concerned, a great precision of form and of surface appearance.

The mirror elements 2 constituted by thin flat plates of silver-plated glass, rectangular-shaped for example, are stuck on the reference surface 10, after the molding of the structure 11, said surface being already fitted with its pre-stressing elements 3 as this will be explained hereinafter. The mirror elements 2 are fixed with a material 21 such as thermoplastic rubber known as "neoprene." The adhesive layer is meant to secure the mirrors on the reference surface 10 whilst absorbing any indifferential deformations occurring between the concrete and the glass when the reference surface 10 is deformed by the pre-stressing elements 3 to receive the desired pre-determined shape. The mirror elements 2 in the final position, are in fact fixed on the surface 10 essentially by points at their angles. The mirror elements 2 are arranged in mosaic, very close to one another, although not edge to edge. Joints 22 separate the different mirror elements 2. The joints 22 in plastic material, ensure, as does the adhesive layer 21, the absorption of any differential deformations between the continuous reference surface 10 of the concrete, which shows a certain concavity, and the discontinuous surface constituted by all the plane mirrors 2 articulated at the level of the joints 22 to constitute an overall reflecting surface very close to the reference surface 10. The glass tiles 2 stuck on the surface 10 of the stable structure 11 are not subjected to any special stresses and therefore they can be very thin. The light losses inside the glass are consequently reduced. The silver-plated mirror elements may thus have a thickness of the order of several tenths of a millimeter. It is understood that, although plates of silver-plated glass are preferred to constitute the basic material in reflecting mirror elements, other types of reflecting materials can constitute mirror elements. These can be in the form of films rather than in the form of thin rigid plates. In any case, the adhesive layer 21 has a resiliency with which it can absorb part of the shear distortions which are due to the fact that when the concavity of the reference surface 10 of the concrete is adjusted, said surface becomes rather more deformed than the discontinuous reflecting surface constituted by all the reflecting surface elements 2.

An example of embodiment of the prestressing elements 2 with which is equipped the structure 11 supporting the reflecting surface constituted by the mirror elements 2 is now described.

A plurality of wires 3 arranged in sheet form is embedded in the concrete structure 11 according to a surface which is offset with respect to the average median surface MM' of the structure 11. The sheet of wires 3 is for example situated at a distance e of the said surface MM'. A pulling action exercised on the ends of the wires 3 issuing from the concrete structure 11 thus permits to exert on said structure a pre-stress which causes a deformation thereof. Inasmuch as the wires 3 are regularly divided inside the structure 11, for example in two series of wires interlaced in two perpendicular directions and inasmuch as the stresses exerted on the ends of the wires are well balanced, it is possible to create an isotrope pre-stressing throughout the structure 11 and thus to produce a uniform overall deformation of the reference surface 10. It should be noted that the control of the pre-stressing by action on the different control wires, for example by means of threaded rods, can be done very progressively, thereby permitting a very precise adjustment of the concavity of the surface 10, and as a result the focusing of the mirror 1. The control wires can for example be fitted in interlaced sheaths and incorporated in the structure 11 when the concrete is poured. Different arrangements of the pre-stressing elements are possible. For example, the two series of orthogonal wires may be parallel respectively to the sides 101 and 104 of the edge of the structure 11 defining the surface 10. But the different series of wires can also be arranged in parallel to the diagonals of the large faces of the structure 11. In such a case, the action exerted on the pre-stressing wires can make it easier to correct any warpings that may have occurred when pouring the concrete. It is of course possible to combine the different actions stated above, by combining more than two series of wires. For example it is possible to use two series of pre-stressing wires parallel to the sides 101, 103 and 104, respectively, of the large faces of the structure 11 and two series of pre-stressing wires substantially parallel to the diagonals of the large faces of the structure 11.

Figure 3:
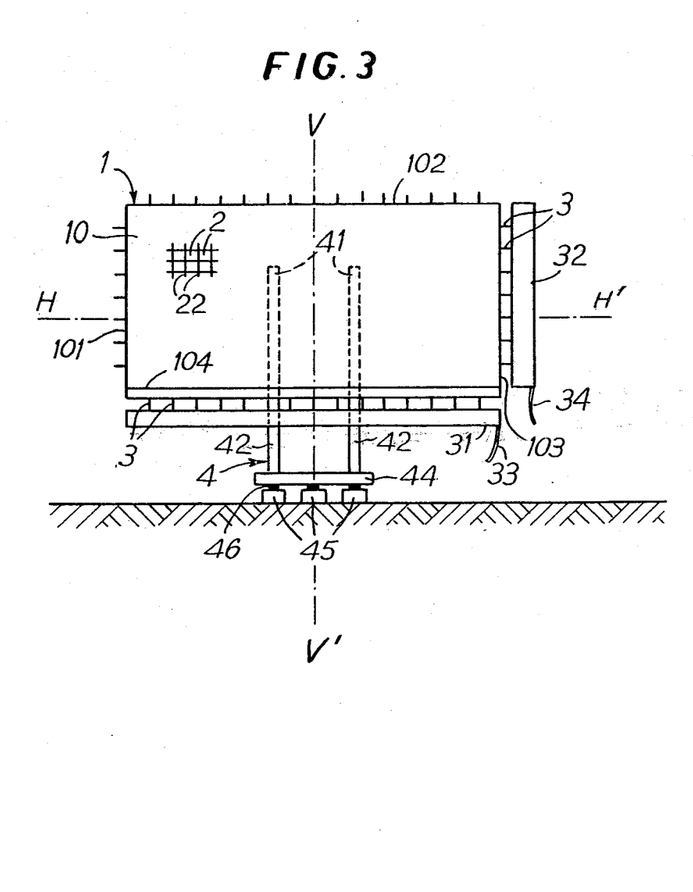
FIGS. 3 and 4 are front and elevational views respectively of a mirror according to the invention mounted to pivot on his support.

It is possible by acting individually on each pre-stressing wire to control locally and accurately the concavity of the structure 11 and in particular of the reference face 10, and for example, to obtain, depending on the degree of stress exerted on each wire, the formation of a spherical, parabolic or ellipsoidal surface. The ends of the different wires in one series of parallel wires 3 can also be connected to a joint control unit, operated for example by one screw jack. In such a case, the control of the curvature of the large faces of the structure 11 is particularly simple and rapid. For example, FIG. 3 shows the ends of the pre-stressing wires 3, parallel to the large sides 102, 104 of the mirror 1, connected to a device 32 controlled by the line 34. In the same way, the pre-stressing wires 3 parallel to the small sides 101, 103 of the mirror 1 are connected to a device 31 controlled by the line 33. The action exerted by a device 31 or 32 on one wire individually may be automatically controlled as a function of the position of the wire.

When building a series of mirrors of the type according to the invention for use in heliostats and which, consequently, may be called upon to have different concavities depending on their position in the field of heliostats, it is possible to use only a restricted number of molds or forms to cast the different structures. Indeed for a whole series of mirrors of closely similar concavity, it is possible to use only one form of mean concavity to produce the reference surface 10, and thereafter to adjust the final concavity with the pre-stressing elements 3. In the case of mirrors 1 with a very slight concavity, which is often the case with heliostat mirrors with a relatively remote focusing point, often of the order of 1 kilometer, the concrete may be poured on a plane form so as to make a plane reference surface 10. The desired curvature is then obtained exclusively by acting on the pre-stressing elements.

The building method according to the present invention permits without restrictions, to produce large-sized mirrors, for example mirrors of up to 50 m2, because of the rigidity of the structure and because of the easy assembly of the mirror elements and the easy control of the curvature of the reflecting face. The thickness of a structure 11, which varies with the applications, may be of the order of 20 to 30 cm. In this case, and if the honeycomb type design is adopted, the shell 12, 13 may for example have a thickness of the order of 3 to 4 cm.

Figure 4:
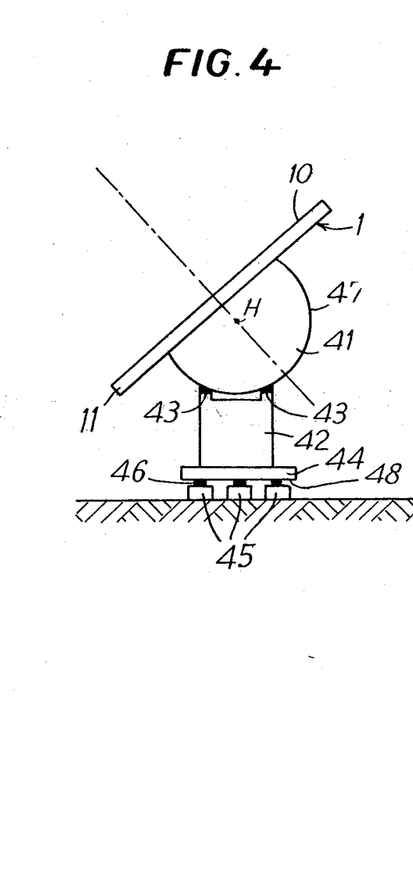

FIGS. 3 and 4 illustrate an example of support for the structure 11, which allows the mirror 1 to move and in particular to pivot with respect to a vertical axis and to a horizontal axis.

Two portions of concrete disc 41 are fixed to the rear face of the structure 11 which is opposite to the reference face 10 supporting the reflecting elements 2. Said discs 41 are mounted to pivot about a horizontal axis HH' and are provided with an edge 47 covered with a strip of polished stainless steel. The discs 41 are supported on their periphery by bearings 43 made of the synthetic fluorine-containing resin sold under the trademark Teflon, a trademark of E. I. duPont de Nemours & Co., and fitted on posts 42. Said discs 41 thus supported by the posts 42 can pivot about their horizontal axis HH' under the action for example of a jack, not shown, whose point of application is in a point of the discs 41. Frictions are limited because of the smooth sliding of the stainless steel strip 47 on the Teflon bearings 43. Rolling members could of course replace the sliding members 43, 47.

The posts 42 are themselves supported by a platform 44 in reinforced concrete whose lower face is covered with a polished metal such as for example a sheet 48 of stainless steel. Said platform 44 can pivot about a vertical axis VV' and rests on three bearings 46 in Teflon and integral with base blocks 45. The means for operating the platform 44, a jack for example, are not shown on the figures. Of course, just as in the case of the sliding surfaces 43, 47, the sliding members 46, 48 could also be replaced by rolling members.

The unit shown in FIGS. 3 and 4 constitutes a steerable mirror which is particularly stable because of the bulk of the parts 11, 41, 42, 44 made of concrete. Said unit is very easy to assemble and most of the elements can be made on site. In addition, it requires a minimum of maintenance. A utilization in the open, as this is the case with heliostats which are meant to reflect the sun light, will not affect its reliability due to the concrete supports which can withstand weather inclemencies and ensure a good stability against atmospheric perturbations such as winds.

Figure 5:
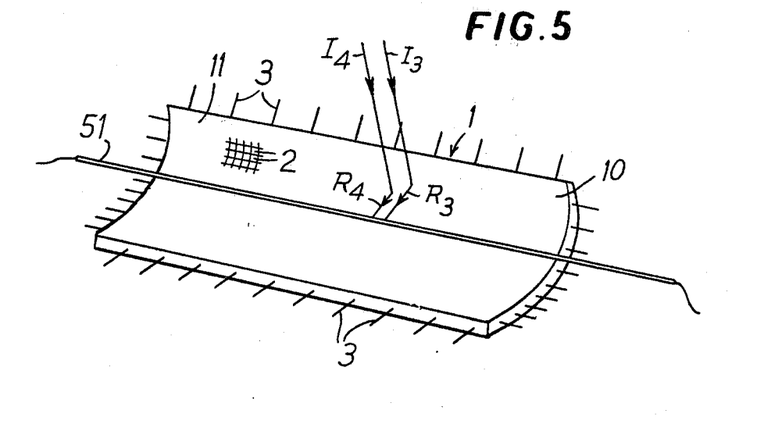
FIG. 5 is a perspective of a variant of embodiment of a mirror according to the invention.

The invention is applicable to mirrors with curvatures of different shapes. In FIG. 5, for example, there is shown a structure 11 with a cylindrical surface 10. In such a case, the prestressing elements 3 arranged perpendicular to the generatrices of the surface 10 are particularly important for controlling the concavity.

Figure 6:
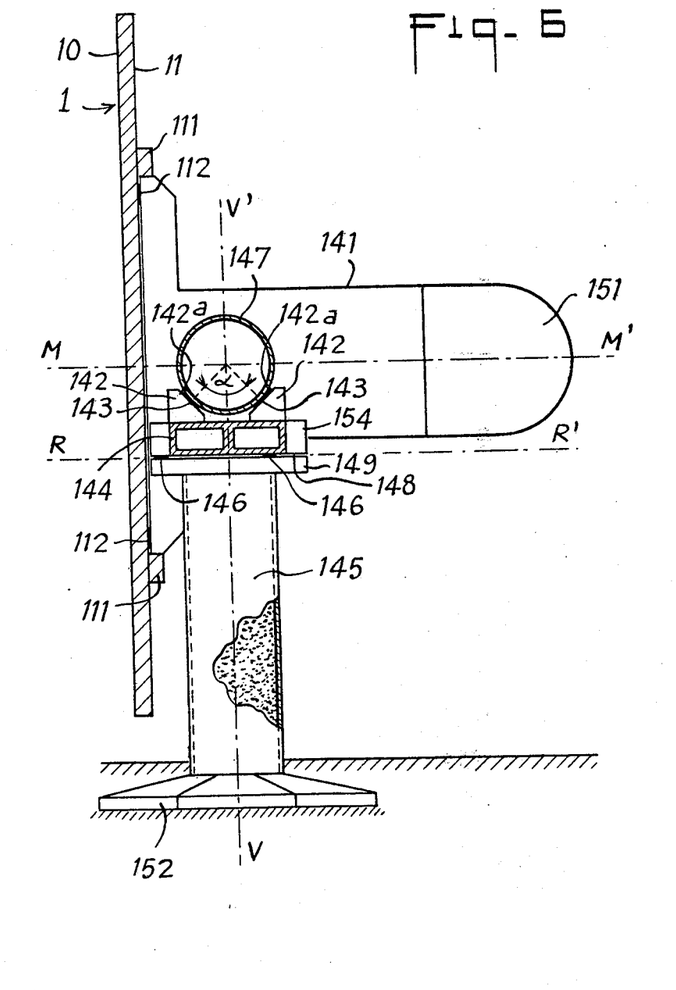
FIG. 6 is a cross-sectional view of a focusing mirror according to the invention, taken along line VI—VI of FIG. 7.

FIG. 6 illustrates another example of focusing mirror according to the invention. This consists in a mirror 1 proper so called, composed of a molded concrete structure 11 supporting on a reference face 10 a plurality of small plane mirror elements, not shown in FIG. 1, arranged at a small distance from one another, although not placed edge to edge. The structure 11 is diagrammatically illustrated with plane and parallel faces. In actual fact, some pre-stressing elements 3 (see FIG. 9) are incorporated in the structure 11 and make it possible to confer to the latter, and in particular to the reference face 10, a slight but predetermined concavity which allows the mirror 1 to concentrate the light into one or more focusing points.

The structure 11 of the mirror 1 is mounted on a support assembly which permits large movements of the mirror 1 and in particular rotations with respect to a vertical axis and to a horizontal axis.

Two arms 141 in concrete are fixed to the rear face of the structure 11 which is opposed to the reference face 10 supporting the reflecting elements. Each arm 141 is secured to the structure 11 for example with a material 112 such as neoprene. Each arm 141 is set in between abutments 111 which form part of the molded concrete structure 11 and which project with respect to the rear face of said structure. Each concrete arm 141 is provided on its free end side with a wider part 151 constituting a counter-weight.

A cylinder 147 is mounted between the two arms 141 so that its axis HH' is in the median plane MM' of the structure 11. Said median plane MM' is the horizontal median plane of the structure 11 when the latter is in the vertical position (as shown in FIG. 6). The cylinder 147, which may be made of concrete and covered with a strip in polished stainless steel for example, is preferably situated at a short distance of the mirror 1.

The cylinder 147 is supported by bearings 143 in Teflon fitted on the upper part 142 of a concrete plate 144. The cylinder 147 can slide on the bearings 143 and thus rotate about its axis, causing the mirror 1 to tip, which mirror, driven by the arms 141, pivots about the horizontal axis HH' of the cylinder 147. The tipping movement of the mirror 1 and of its support constituted by the arms 141 and the cylinder 147 may be controlled for example with a jack, not shown, whose point of application is either on the cylinder 147 or on the arms 141.

Figure 7:
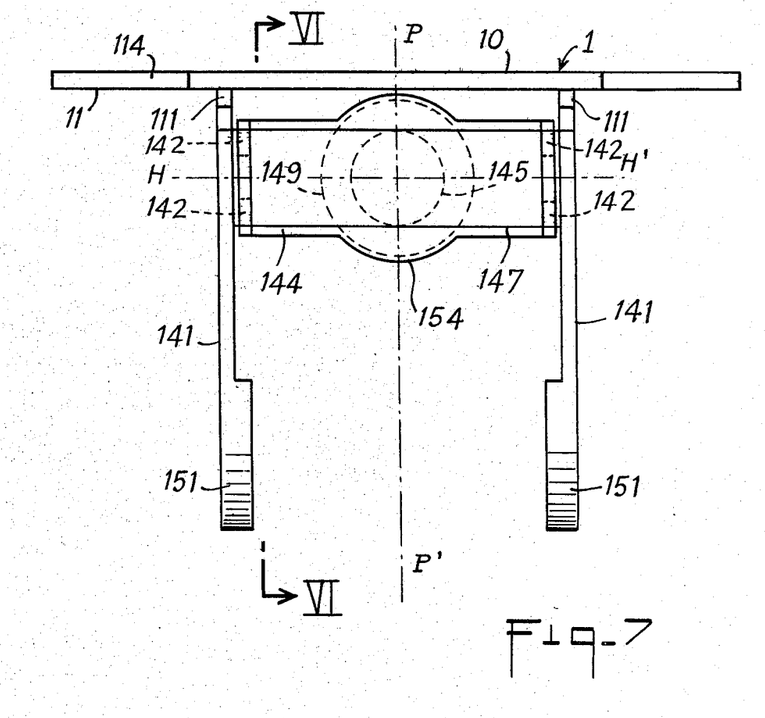
FIG. 7 is a top view of a focusing mirror according to the invention.

The upper part 142 of the plate 144 may be cradle-shaped to receive the cylinder 147 by way of the Teflon bearings 143 integral with the cradle 142. FIGS. 6 and 7 show the upper part 142 of the plate 144 as being composed of two pairs of wedges 142 with top surfaces 142a downwardly inclined, with respect to the horizontal, parallel to the axis HH' of the cylinder 147 and tangential to the latter. Said two pairs of wedges 142 are situated respectively adjacent each end of the cylinder 147. The wedges 142 of each pair of wedges are symmetrical with respect to the axial vertical plane of the cylinder 147 and arranged in such a way that the angle α in the centre, having its apex on the axis HH' and being determined by the contact points of the cylinder 147 on the bearings 143 fixed on the faces 142a of the wedges 142, is between 45° and 120° approximately. In the example illustrated in FIG. 6, the angle α is about 90° and the surfaces 142a are inclined by about 45° with respect to the horizontal.

It will be noted that with a cylinder 147 as sliding surface on the bearing 143, it is possible, by selecting a sufficiently open angle α, to confer a very good stability to the focusing mirror according to the invention in its application as an heliostat, when the mirror 1 is in the rest position, i.e. in vertical position. In case of very strong winds, the heliostat can thus always be returned to a vertical rest position where the good support afforded to the cylinder 147 by the bearings 143 on the plate 144, the bulk of the concrete elements and the counter-balancing weight created by the arms 141, ensure a remarkable stability. Moreover the presence of the counter-balancing weights 151 affords more clearance during the rotations of the cylinder 147 about its axis HH'.

The body of the concrete plate 144 supporting the cylinder 147 may be of substantially parallelepipedal shape, of width approaching or slightly more than the diameter of the cylinder 147, and it can have for example a honeycombed structure. In the example of embodiment shown in FIGS. 6 and 7, the plate 144 is provided with a central part 154 which is wider and defines a disc of diameter slightly greater than that of the cylinder 147. The lower face 148 of the central disc 154 of the plate 144 is covered with a polished metal sheet such as a sheet of stainless steel for example. The plate 144 defining a support platform for the cylinder 147 can pivot about a vertical axis VV' and rests on Teflon bearings 146 integral with a concrete plate 149 which constitutes the cap of a concrete post 145 anchored to the ground by a base 152.

The means for actuating the platform 144, constituted for example by a jack, are not shown in the figures. The polished metal Teflon contact means help to give a sliding movement with reduced friction. Said sliding means 146, 148 could of course be replaced, as a variant, by rolling members.

The fact that the cylinder 147 is mounted directly on platform 144 which is itself pivotally mounted on a post 145, 149 increases the stability of the system. The rotation plane RR' about the vertical axis VV' which is itself situated at the intersection of the vertical median plane PP' of the structure 11 of the mirror 1 and of the vertical axial plane of the cylinder 147, can indeed be placed relatively high, for example, it can be situated at a distance of the horizontal lower edge of the structure 11 which varies between about a third and half the height of said structure.

Figure 8:
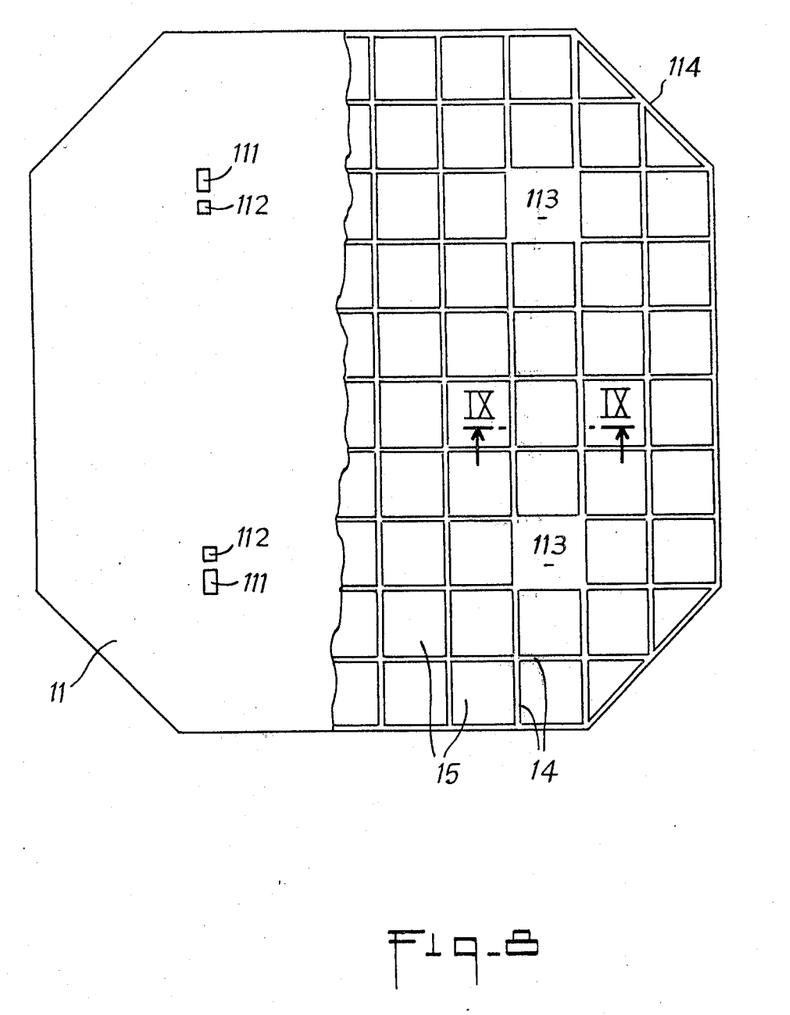
FIG. 8 is a rear view of a cast concrete structure supporting the reflecting face of the focusing mirror.
Figure 9:
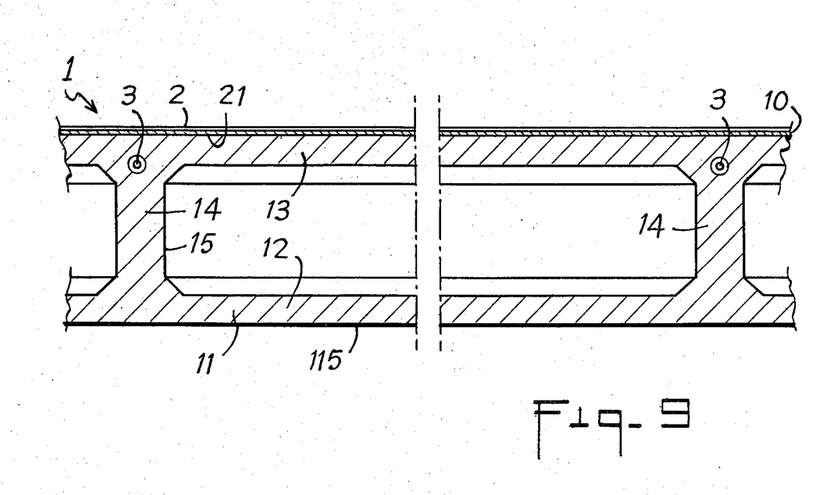
FIG. 9 is a cross-section along line IX—IX of FIG. 8.

FIGS. 8 and 9 show an example of mirror 1 which may be incorporated to a unit such as that shown in FIGS. 6 and 7. As already indicated with reference to FIG. 2, the mirror 1 advantageously comprises a honeycombed structure in reinforced concrete 11. Concrete ribs 14 cross-brace a double shell 12, 13 also in concrete, and define cells 15 which when the concrete is poured, may be sealed off by cardboard boxes for example. Levelled up areas 113 without cells are provided on the side opposite the reference surface 10, with projection 11 and receive a material such as neoprene to ensure the positioning and fixation of the support arms 141. The structure 11 may for example be square-shaped and have chamfers 114 at its angles. Metal pins 3 incorporated in the structure 11 permit to give the latter a predetermined concavity on the side of the reference surface 10. Said reference surface 10 is fitted with a plurality of silver-plated glass plates, secured to the structure 11 by way of a binding layer. On the side opposite the reflecting surface, the structure 11 may be coated with a protective layer 115.

Various modifications and additions may of course be brought by any one skilled in the art to the devices described by way of example only.

Thus, the concrete cylinder 147 may be secured to the arms 141 by any suitable means and can for example be provided at its ends with two cone-shaped parts adhesively fixed to the said arms 141.

What is claimed is:

1. An adjustable focusing mirror, comprising a support on which is mounted a plurality of small plane mirror elements, wherein the support of the focusing mirror comprises a molded concrete structure with a reference face on which the small plane mirror elements are adhesively fixed, at a small distance from one another, but without any contact between them, and wherein the molded concrete structure is fitted with pre-stressing elements for adjusting the concavity of the said reference face carrying the mirror elements.

2. A mirror as claimed in claim 1, wherein the molded concrete structure is constituted by a honeycombed structure comprising an outer shell in reinforced concrete braced by concrete ribs separating the different cells.

3. A mirror as claimed in claim 2, wherein the cells are filled with a light padding material.

4. A mirror as claimed in any one of claims 1 to 3, wherein the pre-stressing elements are constituted by threaded elements distributed over a surface which is offset with respect to the average median surface of the molded concrete structure.

5. A mirror as claimed in claim 4, wherein the pre-stressing elements are constituted by at least two series of threaded rods situated in substantially perpendicular directions, and wherein the threaded rods in each series of threaded rods may be controlled simultaneously from a single actuating means.

6. A mirror as claimed in claim 5, wherein the small mirror elements are adhesively fixed by means of a layer of adhesive of thermoplastic synthetic rubber, and wherein the joining spaces between the said mirror elements are also filled with a plastic material.

7. A mirror as claimed in claim 1, wherein the support comprising the molded concrete structure on which are fixed the mirror elements, is mounted to pivot with respect to two perpendicular axes.

8. A mirror as claimed in claim 7, wherein the support comprises at least a concrete element shaped as a portion of disc integral with the structure on which are fixed the mirror elements, on the side opposite the reference face carrying said mirror elements and wherein the said disc-shaped element is covered on its edge with a strip of metal which can slide on Teflon bearings situated on a concrete post.

9. A mirror as claimed in claim 8, wherein the concrete post supporting the concrete disc is mounted on a plate provided with a lower contact surface in polished metal which rests on Teflon bearings and can slide with respect to the latter.

10. A mirror as claimed in claim 1, comprising a support integral with the structure on which are fixed the mirror elements, on the side opposite the reference face carrying the said mirror elements, mounted to pivot with respect to two perpendicular axes and comprising a concrete cylinder covered with a metal strip which can slide on first bearings provided on a concrete plate which concrete plate is provided with a lower contact surface in polished metal which can slide on second bearings provided on a fixed concrete post.

11. A mirror as claimed in claim 10, wherein the bearings cooperating with the cylinder and the lower metallic surface of the plate are made of Teflon.

12. A mirror as claimed in claim 10 or in claim 11, wherein the cylinder is mounted on the first bearings so that by sliding on said bearings, it can pivot about a horizontal axis and wherein the plate is mounted on the second bearings so that, by sliding on said bearings, it can pivot about a vertical axis.

13. A mirror as claimed in claim 10, wherein the cylinder axis is situated in the median plane of the molded structure which is parallel to the longitudinal upper and lower edges of the said structure.

14. A mirror as claimed in claim 10, wherein the cylinder is situated adjacent the horizontal median axis of the molded concrete structure.

15. A mirror as claimed in claim 10, wherein the second bearings supporting the plate are fixed in a plane situated, when the molded concrete structure is in the vertical position, at a distance from the lower end of the molded structure which may vary between about a quarter and half the height of the said molded structure.

16. A mirror as claimed in claim 15, wherein the second bearings supporting the plate are fixed in a plane situated, when the molded concrete structure is in the vertical position, at a distance from the lower end of the molded structure which may vary between about a third and half the height of the said molded structure.

17. A mirror as claimed in claim 10, wherein the support integral with the molded structure comprises two arms perpendicular to the said structure, between which arms is suspended the cylinder.

18. A mirror as claimed in claim 17, wherein the two arms of the support integral with the molded structure form a pendulum and are wider at their free end to create a counter-balancing weight to the molded structure.

19. A mirror as claimed in claim 10, wherein the plate comprises a cradle-shaped top part which carries the second bearings and receives the cylinder.

20. A mirror as claimed in claim 19, wherein the top part of the plate comprises pairs of wedges defining inclined surfaces, convergent and parallel to the cylinder axis.

21. A method for making the focusing mirror claimed in claim 1, consisting in pouring concrete into a mold of which at least one form face has a predetermined aspect, with a view to making a concrete structure having at least one reference face, in fitting the said concrete structure with elements capable of pre-stressing the said structure, in sticking on the reference surface of the said structure a plurality of small and thin plane mirror elements at a small distance from one another and with no contact between them, and in adjusting the concavity of the structure by exerting on the pre-stressing elements a tension or a compression.

22. A method as claimed in claim 21 wherein the pre-stressing elements are positioned in the mold before all the concrete is poured in, in an offset manner with respect to the average median surface of the structure to be molded.

23. A method as claimed in claim 21, or in claim 22, wherein when casting the concrete, the said reference surface is a plane.

24. A method as claimed in claim 21 wherein when casting the concrete, a first layer of concrete is first formed on the face of the concrete form constituting the reference surface, then slight padding materials are placed in localized and disjoined areas on the first layer of concrete, and ribs of concrete are cast between the said localized areas of padding, as well as on top of them in order to create a honeycombed structure.

25. A method as claimed in claim 22 wherein when casting the concrete, a first layer of concrete is first formed on the face of the concrete form constituting the reference surface, then slight padding materials are placed in localized and disjoined areas on the first layer of concrete, and ribs of concrete are cast between the said localized areas of padding, as well as on top of them in order to create a honeycombed structure.

26. A method as claimed in claim 23 wherein when casting the concrete, a first layer of concrete is first formed on the face of the concrete form constituting the reference surface, then slight padding materials are placed in localized and disjoined areas on the first layer of concrete, and ribs of concrete are cast between the said localized areas of padding, as well as on top of them in order to create a honeycombed structure.

27. An adjustable focusing mirror, comprising a support on which is mounted a plurality of small plane mirror elements, wherein the support of the focusing mirror comprises a molded concrete structure mounted to a reference face on which the small plane mirror elements are adhesively fixed, at a small distance from one another, but without any contact between them, the molded concrete structure being fitted with pre-stressing elements for adjusting the concavity of the said reference face carrying the mirror elements, said mirror further comprising a support having two arms perpendicular to and integral with the structure on which are fixed the mirror elements, on the side opposite the reference face carrying the said mirror elements, mounted to pivot with respect to two perpendicular axes, said support comprising a concrete cylinder covered with a metal strip which can slide on first, Teflon bearings provided on a concrete plate which concrete plate is provided with a lower contact surface in polished metal which can slide on second bearings provided on a fixed concrete post, said cylinder being mounted on the first bearings so that by sliding on said bearings, it can pivot about a horizontal axis and wherein the plate is mounted on the second bearings so that, by sliding on said bearings, it can pivot about a vertical axis, said cylinder axis being situated in the median plane of the molded structure which is parallel to the longitudinal upper and lower edges of the said structure, said cylinder being situated adjacent the horizontal median axis of the molded concrete structure, and wherein the second bearings supporting the plate are fixed in a plane situated, when the molded concrete structure is in the vertical position, at a distance from the lower end of the molded structure which may vary between about a third and half the height of the said molded structure.

* * * * *